US008360163B2

(12) United States Patent
Hauzer

(10) Patent No.: US 8,360,163 B2
(45) Date of Patent: Jan. 29, 2013

(54) FIRE-EXTINGUISHING SYSTEM IN AN AIR FILTER SYSTEM AND METHOD THEREFOR

(76) Inventor: Antonius Theodorus Cecilianus Hauzer, Zaltbommel (NL)

( * ) Notice: Subject to any disclaimer, the term of this patent is extended or adjusted under 35 U.S.C. 154(b) by 224 days.

(21) Appl. No.: 12/096,631

(22) PCT Filed: Dec. 8, 2006

(86) PCT No.: PCT/NL2006/050310
§ 371 (c)(1), (2), (4) Date: Jul. 12, 2008

(87) PCT Pub. No.: WO2007/067057
PCT Pub. Date: Jun. 14, 2007

(65) Prior Publication Data

US 2008/0257568 A1 Oct. 23, 2008

(30) Foreign Application Priority Data

Dec. 8, 2005 (NL) ...................................... 1030627

(51) Int. Cl.

| | |
|---|---|
| ***A62C 2/00*** | (2006.01) |
| ***A62C 3/00*** | (2006.01) |
| ***A62C 37/00*** | (2006.01) |
| ***A62C 31/22*** | (2006.01) |
| ***F24F 11/00*** | (2006.01) |
| ***A01G 27/00*** | (2006.01) |

(52) U.S. Cl. ................ 169/46; 169/54; 169/56; 169/60; 169/61; 169/70; 454/239; 239/69

(58) Field of Classification Search .................... 169/46, 169/54, 56, 60, 61, 64, 65, 66, 70; 239/69; 454/207, 237, 239
See application file for complete search history.

(56) References Cited

U.S. PATENT DOCUMENTS

| | | | | |
|---|---|---|---|---|
| 4,237,780 | A * | 12/1980 | Truhan | 454/52 |
| 4,955,990 | A * | 9/1990 | Napadow | 95/216 |
| 2004/0129434 | A1 | 7/2004 | Tan | |

FOREIGN PATENT DOCUMENTS

| | | | |
|---|---|---|---|
| DE | 42 23 781 | A1 | 1/1994 |
| DE | 42 27 220 | A1 | 2/1994 |
| DE | 4227220 | A1 * | 2/1994 |
| EP | 1 136 101 | A1 | 9/2001 |

* cited by examiner

*Primary Examiner* — Len Tran
*Assistant Examiner* — Ryan Reis
(74) *Attorney, Agent, or Firm* — Young & Thompson

(57) ABSTRACT

Fire-extinguishing system in an air filter system has an inlet chamber and an outlet chamber with a filter wall therebetween. The system includes a first and second sensor, a first and second fire extinguisher, and a control unit, the first sensor and the first extinguisher being disposed in the inlet chamber, the second extinguisher in an outlet chamber and the second sensor being disposed in an outlet of the outlet chamber. The control unit is connected to the first and second sensors, and to the first and second extinguishers. The control unit records a first and second fire-detection signal in the inlet chamber and the outlet, respectively; compares the first and second signals to an associated threshold value for fire; determines at which location within the inlet and outlet chamber the fire is burning, depending on the comparison; selects which of the first and at least one second extinguisher is located near the determined position, and activates one or more selected extinguishers.

20 Claims, 4 Drawing Sheets

FIRE-EXTINGUISHING SYSTEM IN AN AIR FILTER SYSTEM AND METHOD THEREFOR

Figure 1:
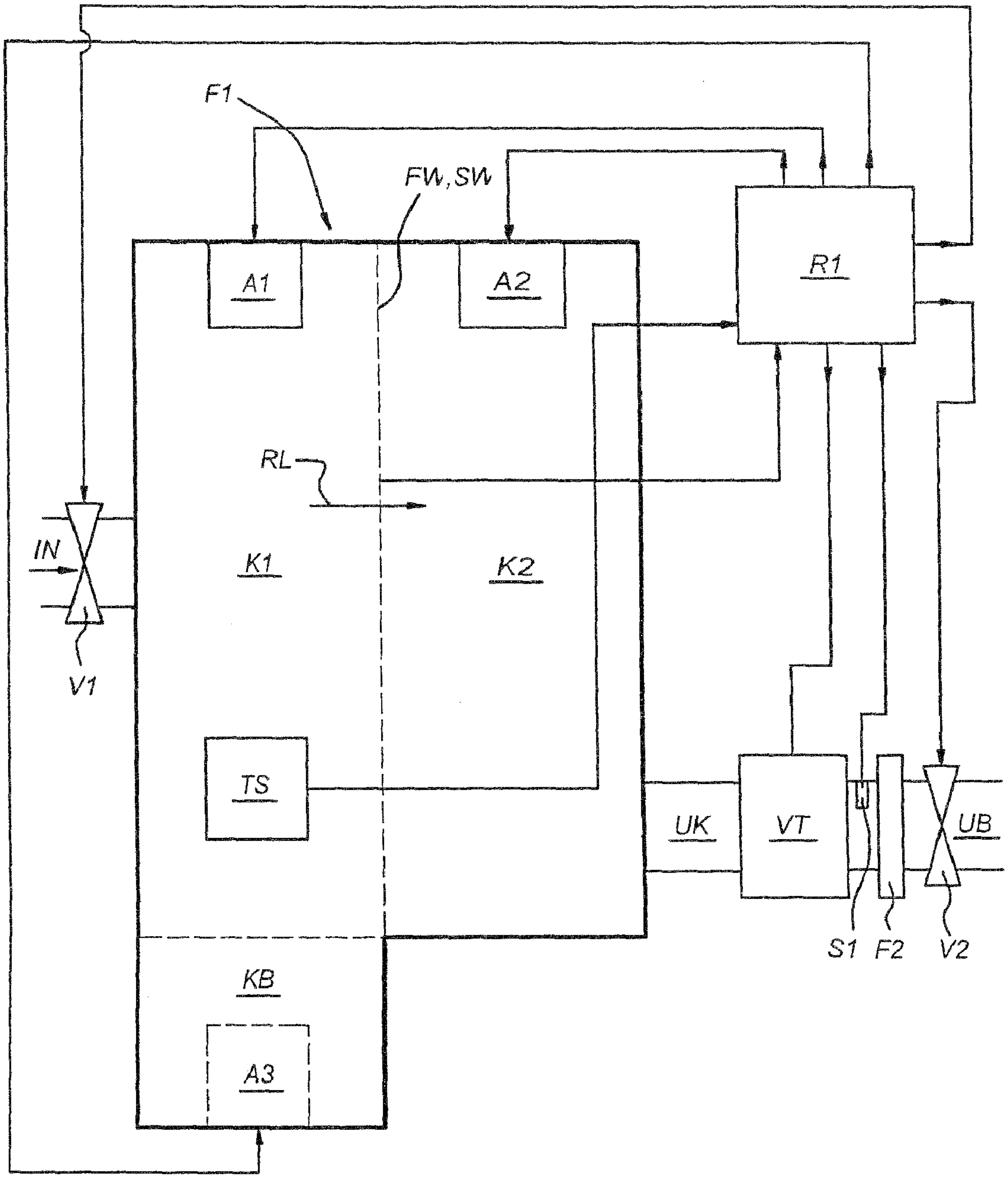

The present invention relates to a fire-extinguishing system according to the preamble of claim 1. In addition, the present invention relates to a method for a fire-extinguishing system. Furthermore, the invention relates to a ventilation system provided with the fire-extinguishing system. The invention also relates to a control unit for carrying out the method, and to a computer program for carrying out the method of the fire-extinguishing system.

Air filter systems are used to filter air which is mixed with polluting particles, so that the filtered air is subsequently essentially free from pollutants. Filtering is carried out in a compartmentalized chamber by passing incoming polluted air from an inlet chamber to an outlet chamber through filter material. The filter material is situated between the inlet and the outlet chamber and forms a barrier for the entrained polluting particles so that only the incoming air is allowed through and, after passing through, can leave the filter system as outgoing air.

Every substance store is a potential fire hazard. Electric discharge, spontaneous heating, sucked in hot particles, chemicals and the like can cause a fire and possibly an explosion.

Other parts of the air filter system may also be flammable.

When the filter material catches fire, this can quickly lead to the complete destruction of the filter installation. Dismantling, cleaning, repair and/or replacement is often complicated and expensive. Damage to the site and consequential damage can result in astronomical costs.

In the prior art, it is known to provide a fire-extinguishing system in air filter systems, the purpose of which is to limit fire damage to the damage of the air filter system. Normally, water is used to extinguish a fire, and although water is highly suitable for extinguishing a fire, use in air filter systems is somewhat undesirable because of the risk of possible chemical reactions with the released substance. The use of water as an extinguishing agent quickly results in additional damage to the filter installation. In addition, the material collected in the filter system is mixed with water, which may lead to the washing out of potentially polluting substances.

It is an object of the present invention to provide a fire-extinguishing system which can limit as much as possible the damage to the air filter system and to the filter material in case of a fire and limits the damage to the working environment and the environment to a minimum.

The present invention achieves this object by means of a fire-extinguishing system in an air filter system having an inlet chamber and an outlet chamber with a filter wall placed between the inlet and outlet chambers; the fire-extinguishing system comprising a first sensor and at least one second sensor, a first fire extinguisher and at least one second fire extinguisher, and a control unit, in which:

the first sensor and the first fire extinguisher are placed in the inlet chamber and the second fire extinguisher is placed in an outlet chamber;

the second sensor is placed in an outlet of the outlet chamber;

the control unit is connected to the first sensor in the inlet chamber, and to the second sensor in the outlet;

the control unit is connected to the first fire extinguisher and to the second fire extinguisher for controlling a release of the extinguishing agent from the first and second fire extinguisher, respectively, and the control unit is designed for recording a first fire-detection signal from the first sensor in the inlet chamber, and a second fire-detection signal from the at least one second sensor in the outlet;

comparing the first signal and the second signal to an associated predetermined threshold value to determine if a fire is burning;

determining at which location within the inlet and outlet chamber the fire is burning as a function of the result of the comparison of the first and second signals, respectively;

selecting which of the first and at least one second fire extinguisher is located at the detected location, and activating, by means of one or more control signals, the one or more selected ones of the first and at least one second fire extinguisher in order to release the extinguishing agent.

The fire-extinguishing system according to the present invention achieves this in an advantageous manner by selectively extinguishing the fire only at that location in the air filter system where the fire may be burning. This results in limiting the damage to the remainder of the filter as much as possible.

According to a further embodiment, the fire-extinguishing system provides for the use of at least one closable inlet valve and at least one closable outlet valve on the inlet and outlet side, respectively, of the filter system. This advantageously makes it possible to close off the air filter system from the environment when a fire starts in the air filter system, thus making it possible to fight the fire in an efficient manner and remove any combustion products which have reached the living space.

According to a further embodiment of the present invention, the fire-extinguishing system provides an outlet filter in the discharge line of the air filter system. This advantageously makes it possible to collect released extinguishing agents on the discharge side of the air filter system without these waste products being able to be discharged from the air filter system into the environment.

According to yet another embodiment of the present invention, the fire-extinguishing system provides fire extinguishers using aerosol as extinguishing agent, the discharge of aerosol from the fire extinguisher being diverted to avoid direct contact with the filter material. In this case, it is advantageously prevented that the aerosol causes fire as a result of the high discharge temperature at a point of contact with the filter material.

According to a further embodiment of the present invention, the control unit of the fire-extinguishing system is designed such that it goes through a waiting period after activation, by means of the one or more control signals, of one selected one of the first and at least one second fire extinguisher for release of extinguishing agent into one chamber of the inlet and outlet chambers, and such that, once the waiting period has passed, it activates another, non-selected one of the first and at least one second fire extinguisher in order to release extinguishing agent into the other chamber of the inlet and outlet chambers.

In this manner, an improved flushing through the filter material with extinguishing agent can be effected.

Furthermore, the present invention relates to a method for a fire-extinguishing system in an air filter system having an inlet chamber and an outlet chamber with a filter wall placed between the inlet and outlet chambers; the fire-extinguishing system comprising a first sensor and at least one second sensor, a first fire extinguisher and at least one second fire extinguisher, and a control unit, in which:

the first sensor and the first fire extinguisher are placed in the inlet chamber and the second fire extinguisher is placed in an outlet chamber;

the second sensor is placed in an outlet of the outlet chamber; the method comprising the following steps:

recording a first fire-detection signal from the first sensor in the inlet chamber, and a second fire-detection signal from the at least one second sensor in the outlet;

comparing the first signal and the second signal to an associated predetermined threshold value to determine if a fire is burning;

determining at which location within the inlet and outlet chamber the fire is burning as a function of the result of the comparison of the first and second signals, respectively;

selecting which of the first and at least one second fire extinguisher is located at the detected location, and activating, by means of one or more control signals, the one or more selected ones of the first and at least one second fire extinguisher in order to release the extinguishing agent.

The present invention also relates to a control unit for a fire-extinguishing system in an air filter system having an inlet chamber and an outlet chamber with a filter wall positioned between the inlet and outlet chambers; the control unit comprising a processing unit and a memory, the memory being connected to the processing unit; the fire-extinguishing system furthermore comprising a first sensor and at least one second sensor, a first fire extinguisher and at least one second fire extinguisher, in which:

the first sensor and the first fire extinguisher are placed in the inlet chamber and the second fire extinguisher is placed in an outlet chamber;

the second sensor is placed in an outlet of the outlet chamber;

the control unit can be connected to the first sensor in the inlet chamber, and to the second sensor in the outlet;

the control unit can be connected to the first fire extinguisher for controlling a release of extinguishing agent from the first fire extinguisher, and can be connected to the second fire extinguisher for controlling a release of extinguishing agent from the second fire extinguisher, and the control unit is designed for recording a first fire-detection signal from the first sensor in the inlet chamber, and a second fire-detection signal from the at least one second sensor in the outlet;

comparing the first signal and the second signal to an associated predetermined threshold value to determine if a fire is burning;

determining at which location within the inlet and outlet chamber the fire is burning as a function of the result of the comparison of the first and second signals, respectively;

selecting which of the first and at least one second fire extinguisher is located at the detected location, and activating, by means of one or more control signals, the one or more selected ones of the first and at least one second fire extinguisher in order to release the extinguishing agent.

Finally, the present invention also relates to a computer program which, once it has been loaded onto the control unit, enables the control unit to control the method for the fire-extinguishing system as described above.

The invention will be explained below in more detail with reference to a few drawings, which show exemplary embodiments. They are solely intended for illustrative purposes and not as a limitation of the inventive idea which is defined by the claims.

Figure 2:
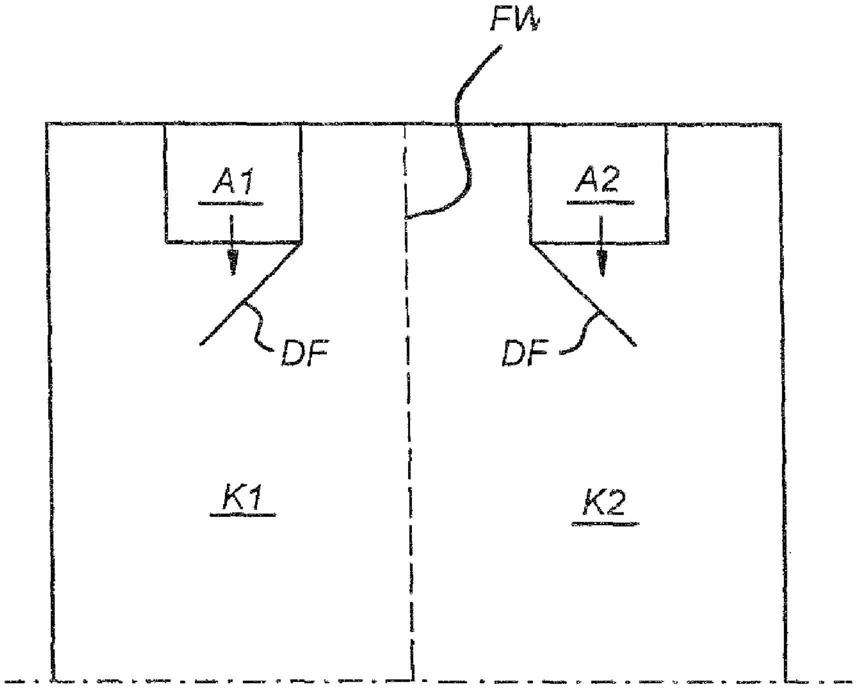
Figure 3:
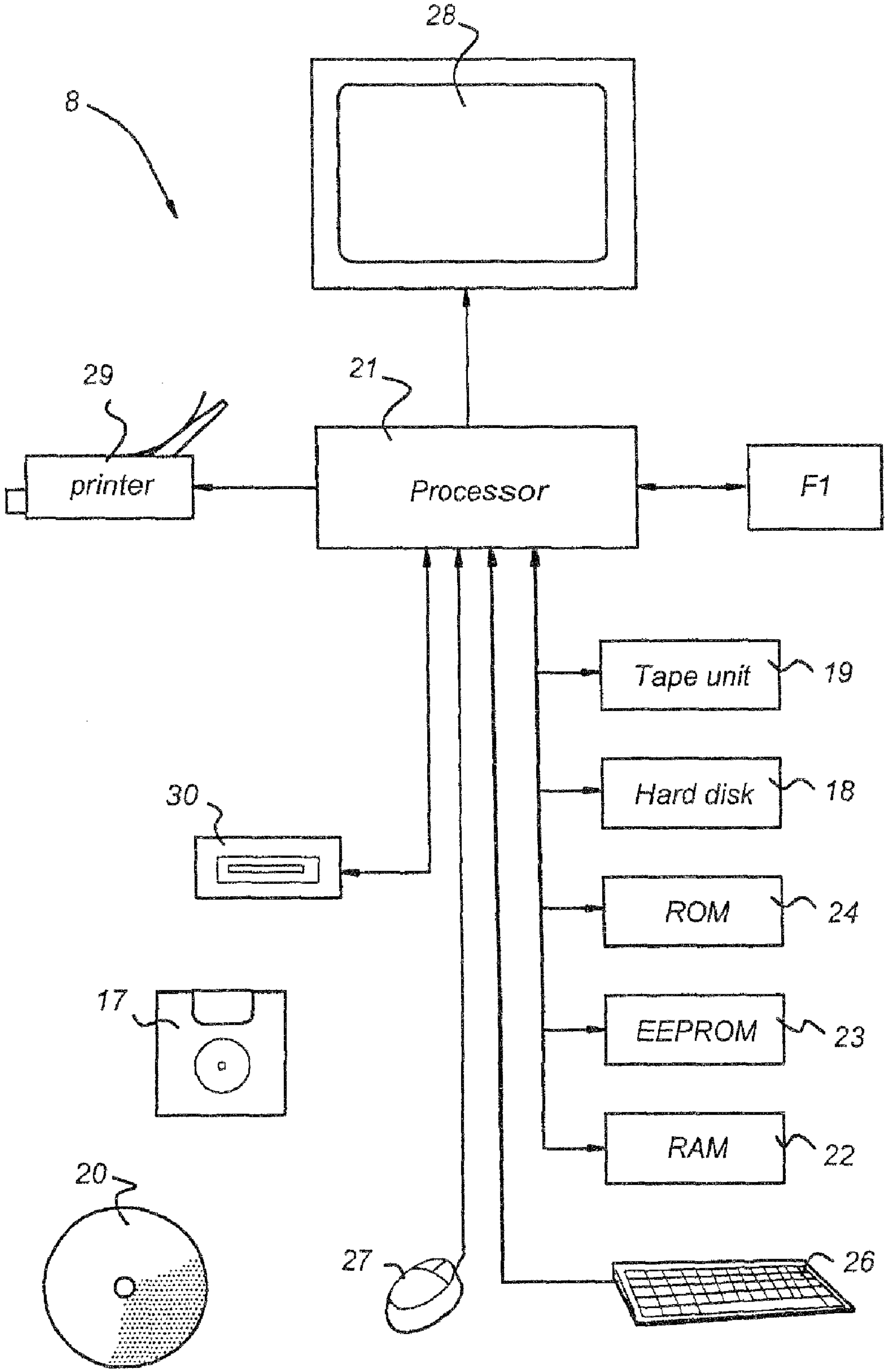
Figure 4:
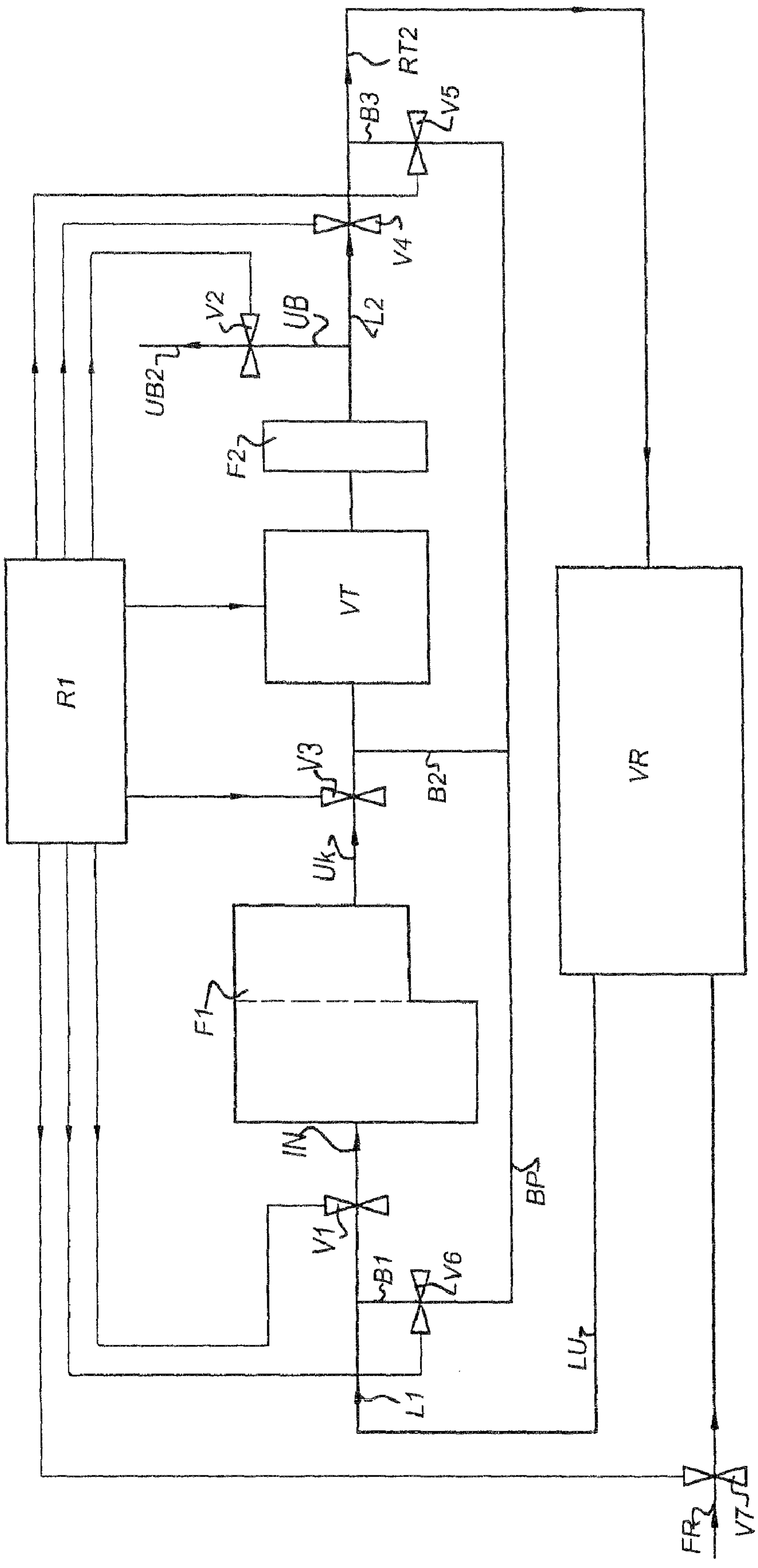

FIG. 1 diagrammatically shows an air filter system which is provided with a fire-extinguishing system according to the present invention;

FIG. 2 diagrammatically shows a detail view of the air filter system according to FIG. 1;

FIG. 3 shows the block diagram of a control unit for use in the fire-extinguishing system according to the present invention, and FIG. 4 shows a further embodiment of the fire-extinguishing system.

FIG. 1 diagrammatically shows an air filter system provided with a fire-extinguishing system according to the present invention.

The air filter system F1 comprises an inlet chamber K1 and an outlet chamber K2 which are separated from one another by a filter wall FW. On an inlet side, inlet chamber K1 is connected to an inlet IN, via which, in use, air which is mixed with polluting particles can be supplied. On an outlet side of the filter system, outlet chamber K2 is connected to the outlet duct UK in order, in use, to discharge filtered air from the outlet chamber K2. The outlet duct UK is connected to an intake opening of the ventilation system VT. The outlet side of the ventilation system VT is connected to an inlet side of an outlet filter F2 via a discharge duct. The outlet side of the outlet filter F2 is connected to a blow-off duct UB. The direction of flow of air through the air filter system F1 is indicated by an arrow RL.

Inlet chamber K1 is also connected to a collecting chamber KB in order to make it possible, in use, to store filtered out polluting particles.

Inlet duct IN is provided with a valve V1 in order to make it possible to close off inlet chamber K1. Blow-off duct UB is likewise provided with a valve V2 in order to make it possible to close off the blow-off duct.

The filter wall FW is diagrammatically indicated as a flat wall between inlet chamber K1 and outlet chamber K2. It should be noted that a different configuration of the inlet and outlet chambers K1, K2 is also possible and so the shape of the filter wall can also be different. For example, the outlet chamber K2 may consist of a number of subchambers, which are each individually separated from the inlet chamber K1 by the filter wall.

A temperature sensor TS, with which the temperature in the inlet chamber K1 can be determined, is included in the inlet chamber K1. Furthermore, a discharge sensor S1 is placed on the outlet side of the ventilation system VT.

If desired, a further temperature sensor SW may be present in the form of a filter wall sensor which extends along the filter wall FW.

The discharge sensor S1 is designed for measuring the pollution density of the air extracted by the ventilation system VT from the outlet chamber K2. The fact is that, in case of a fire or leakage of the filter, the ventilation system VT will mix the extracted air with any polluting particles and/or fire by-products and concentrate these substances.

A first fire extinguisher A1 containing fire-extinguishing agent is provided in inlet chamber K1. A second fire extinguisher A2 which likewise contains fire-extinguishing agent is provided in outlet chamber K2.

If desired, a third fire extinguisher A3 containing a fire-extinguishing agent may be provided in the collecting chamber KB.

In the present invention, an aerosol is used as fire-extinguishing agent, as will be explained in more detail below.

Finally, the fire-extinguishing system according to the present invention comprises a control unit R1 for controlling the fire-extinguishing system according to the present invention.

The control unit R1 is connected to sensors TS, S1 present in the fire-extinguishing system and to SW, if present, in order to record the fire-detection signals thereof.

The control unit R1 is also connected to the ventilation system VT for control thereof.

Furthermore, the control unit R1 is connected to inlet valve V1 and outlet valve V2 for actuating both in order thus to be able to close off the inlet chamber K1 and outlet chamber K2 from the environment.

Finally, the control unit R1 is connected to the first, second and third (if present) fire extinguisher A1, A2, (and A3).

In operation, according to the present invention, a fire is detected and fought as follows. An incoming particle entering the inlet chamber K1 from the inlet duct IN causes the material collected in the filter and/or the filter material to catch fire.

A fire will always start in the inlet chamber K1, since that is where material can be introduced from outside.

The control unit R1 is designed to record the temperature in the inlet chamber K1 via the temperature sensor TS.

If the filter wall sensor SW is present, the control unit R1 may also record the temperature of the filter wall.

In addition, the control unit R1 is able to record, via the discharge sensor S1, if the air blown off by the ventilation system VT at the blow-off duct still contains particles and/or by-products of a fire.

In view of the fragility of the filter material, which often consists of a paper-like or plastic material, a fire may cause damage to the filter material and produce combustion products, which are discharged to the blow-off duct UB via the outlet chamber K2 and from outlet duct UK through the ventilation system VT. As a result of the pump action of the ventilation system V2, the combustion products are concentrated at the outlet side of the ventilation system VT. The discharge sensor S1 which is installed there is able to measure the pollution present in the air extracted by the ventilation system. It should be noted that it is not only possible to measure combustion products in this manner, but that likewise any leaks present in the filter material between the inlet chamber K1 and the outlet chamber K2 caused by the action of hot particles will lead to a flow of polluting particles from the inlet chamber to the outlet chamber. These polluting particles which have passed through will also be concentrated on the outlet side of the ventilation system.

The control unit R1 is presently designed to detect that a fire may have started in the air filter system if one or more of the sensor signals originating from TS, S1 and SW exceed(s) a predetermined threshold value, which corresponds with a predetermined temperature (in the case of TS and SW) or a predetermined amount of pollutants (in the case of S1).

As hot particles in the filter system F1 always originate from inlet duct IN, a fire will most likely start in inlet chamber K1. When a fire starts, an increase in temperature in the inlet chamber K1 will therefore be recorded.

It is possible that the fire in the inlet chamber K1 also causes a fire on the filter wall F2, but this is not necessarily the case. However, if a fire does start on the filter wall, this could be recorded by the discharge sensor S1 and/or by filter wall sensor SW.

On the basis of the signals received from the temperature sensor TS, the filter wall sensor SW and the discharge sensor S1, the control unit R1 determines if a fire has indeed started and if so, in which section of the filter system the fire is burning. The method which the control unit R1 uses may involve, for example, a rule set or a look-up table.

When the control unit R1 records that the temperature in the inlet chamber K1 has increased (via a fire-detection signal of the temperature sensor TS), the control unit R1 will emit a control signal to the first fire extinguisher A1 in order to release the fire-extinguishing agent present in the container to the inlet chamber K1.

When the control unit R1 also receives a signal from the discharge sensor S1 which exceeds the threshold value for a fire, the control unit R1 can also emit a control signal to the second fire extinguisher A2 in order to release the fire-extinguishing agent present therein to the inlet chamber K2.

Likewise, the control unit R1 can use the signal that is received from the filter wall sensor SW (if present). If an increased temperature (above a predetermined threshold value) is detected on or near the filter wall FW, the control unit R1 may determine that the fire is possibly burning in both the inlet chamber K1 and the outlet chamber K2 and that fire-extinguishing agent has to be released into both chambers K1, K2.

Advantageously, this results in fire-extinguishing agent being used only at that location in the air filter system F1 where there is actually a fire. Thus, it is possible to limit the damage to the air filter system F1 and components thereof as much as possible.

In a further embodiment, a third fire extinguisher A3 is present in the collecting chamber KB and can be used together with the first fire extinguisher A1 or instead thereof. In this embodiment, it is possible to place a separate (temperature) sensor in the collecting chamber KB (not shown) in order to measure the temperature increase locally, so that it becomes possible to detect and fight a fire locally.

In order to fight a fire in the air filter system F1 as efficiently as possible, the control unit R1 will, upon detection of a fire, be able to close off the inlet valve V1 and the outlet valve V2 in order to close off the fire in the air filter system F1 from the environment. Furthermore, the control unit R1 may be designed in order to switch off the ventilation system VT upon detection of a fire in the air filter system.

In the present invention, an aerosol is used as the fire-extinguishing agent. Aerosol compositions are known in the prior art which can be used in a suitable and successful manner for extinguishing a fire. By using an aerosol as extinguishing agent, the disadvantage of using water as extinguishing agent in an air filter system is overcome. In this case, fire extinguishers A1, A2, A3 comprise a device which can release the desired aerosol by explosive combustion of a solid material.

By releasing the fire-extinguishing agent into the inlet chamber K1 and, if necessary, into the inlet chamber K2, the fire will be extinguished.

Then, when the sensor(s) indicate(s) that the temperature has fallen and the fire has therefore been extinguished, the control unit R1 can open the inlet valve V1 and the outlet valve V2 again.

Furthermore, the control unit R1 can start up the ventilation system VT again, so that an air flow will stream through the air filter again. This air flow will collect any polluting particles and fire by-products as well as any remaining aerosol on the outlet side of the ventilation system VT. The fitted outlet filter F2 is designed to collect the polluting particles carried along by the air flow and fire by-products and to prevent these being discharged into the environment via the blow-off duct UB.

In a further embodiment the control unit is designed for repeating the fire-extinguishing operation at least once following a predetermined interval. In this case, the fire extinguishers A1, A2 are designed for repeatedly releasing fire-extinguishing agent, for example by each fire extinguisher comprising several extinguishing agent elements which can be activated separately, or by each fire extinguisher being provided in duplicate.

In another embodiment, the control unit R1 may be designed to first release the fire-extinguishing agent in the sub-chamber where the fire was detected and after a certain delay (a waiting period) also to release the fire-extinguishing agent in the other sub-chamber when a fire is detected in the air filter system F1. In this manner, the fire-extinguishing agent can be flushed through the filter material in an improved manner.

Assuming that a fire is for example detected in the inlet chamber K1 by the control unit R1, then the control unit R1 will ensure that the fire-extinguishing agent from the fire extinguisher A1 located in the inlet chamber K1 is released. The fire-extinguishing agent from fire extinguisher A1 can now spread through the inlet chamber K1 and through the filter material from inlet chamber K1 to outlet chamber K2. The control unit goes through a waiting period and subsequently releases the fire-extinguishing agent from the fire extinguisher A2 into the outlet chamber K2. The fire-extinguishing chamber from the fire extinguisher A2 can now spread through the outlet chamber K2 and through the filter material from the outlet chamber K2 to the inlet chamber K1.

In this manner, the fire-extinguishing system carries out a flushing process in the filter system F1.

The waiting period depends on the size of the inlet and outlet chambers, the size of the filter wall and of the amount of extinguishing agent to be released.

This waiting period may last between a few seconds and approximately one minute, for example.

In this manner, the fire-extinguishing agent circulates through the filter material in an optimum manner.

In yet another embodiment, the control unit is designed to repeat the abovementioned flushing process at least once after a predetermined interval. In this case, the fire extinguishers A1, A2 are designed to release the fire-extinguishing agent repeatedly. The result of this is that when the concentration of the fire-extinguishing agent becomes low as a result of sedimentation (due to gravity) in a section of the air filter system and the temperature in that section of the air filter system is still sufficiently high to allow smouldering or burning, this reduced concentration is increased again by repeated release of fire-extinguishing agent, thus preventing a fire from smouldering or flaring up. The predetermined interval may be chosen in accordance with the shape and features of the air filter system. The predetermined interval is for example between 10 minutes and approximately half an hour to an hour.

When determining the interval, it is also possible to take external circumstances into account, such as the availability of the fire services for a check-up of the air filter system.

FIG. 2 shows a diagrammatic detail view of the air filter system F1 according to FIG. 1. Identical reference numerals to those in FIG. 1 refer to identical elements.

The fire-extinguishing system according to the present invention uses a first and at least one second fire extinguisher A1, A2 filled with a fire-extinguishing agent, and if desired a third fire extinguisher A3 filled with a fire-extinguishing agent. As described above, the fire-extinguishing agent which is used in the fire-extinguishing system according to the present invention is an aerosol.

Such an aerosol is produced in the fire extinguisher by explosive combustion of a suitable solid. When the aerosol emerges from the fire extinguisher, the temperature of the aerosol is still so high that direct contact with the filter wall FW could lead to this filter wall catching fire. It is known that an aerosol flowing out can reach a temperature of 300° C. Such a temperature during contact is generally too high for usual filter materials such as paper and plastic. For this reason, each fire extinguisher in the fire-extinguishing system according to the invention is positioned such that direct contact of the aerosol flowing out with the filter material is prevented. Direct contact of the aerosol flowing out with other flammable parts of the air filter system should also be prevented. To this end, the discharge opening of the fire extinguisher can be set in such a manner that the aerosol does not flow out in the direction of the filter material (or other flammable parts). Alternatively, a so-called deflector panel DF may be provided on each fire extinguisher in order to protect the filter wall FW against direct contact with the aerosol flowing out of the fire extinguisher. FIG. 2 diagrammatically shows the filter wall FW with the first fire extinguisher A1 and the second fire extinguisher A2 on either side. The first and second fire extinguishing agent containers A1, A2 are each provided with a deflector panel DF. The deflector panel DF can withstand the high exit temperature of the aerosol and is positioned such that the filter wall (and/or any other flammable component) is protected from the discharge opening (indicated by an arrow) of the respective fire extinguisher.

In FIG. 2, the deflector panels DF shown are flat panels which are placed at an angle of 45 degrees to the horizontal. It should be noted that it is also possible to use other angle positions and configurations of deflector panels in order to prevent the filter wall material being exposed to the aerosol flowing out. Alternatively, therefore, the deflector panel DF may have a curved shape or be provided with a suitable surface profile.

FIG. 3 shows a block diagram of a control unit R1 which can be used within the fire-extinguishing system according to the present invention.

A (micro) computer system can serve as control unit R1. As an alternative, a programmable logic controller (PLC) could be used. A central computer system 2 comprises a central processing unit 21 with peripherals. The central processing unit 21 is connected to memory means 18, 19, 22, 23, 24 which save instructions and data, and if desired to one or more reading units 30 (in order to read data carriers, such as for example floppy disks, non-volatile memories (such as flash memory cards), CDROMs and DVDs), a keyboard 26 and a mouse 27 as input equipment, and a display screen 28 and a printer 29 as output equipment. It is possible to provide both different input units, such as a track ball, a bar code reader, a scanner and a touch screen, and other output equipment.

Furthermore, the central processing unit 21 is provided with connections 7 to the sensors TS, S1, SW, to the ventilation system VT, to the inlet and outlet valves V1, V2, and to the fire extinguishers A1, A2, A3 within the air filter system F1. (These connections 7 are only illustrated diagrammatically by a single block F1). The memory means shown in FIG. 3 may comprise RAM 22, (E) EPROM 23, ROM 24, tape unit 19, and hard disk 18. However, more or other memory units may be provided, as will be clear to a person skilled in the art. Moreover, one or more of the latter units may be placed at a distance from the central processing unit 21, should this be necessary.

The central processing unit 21 is shown as a single unit, but may also comprise various processing units operating in parallel, or being controlled by one central unit, it being possible for the processing units to be placed at a distance from one another, as is known to those skilled in the art.

The control unit R1 uses a method in which at least two sensors TS, S1 record fire-detection signals. The recorded signals are each compared to a predetermined threshold value associated with the respective sensor.

When the value of a detected sensor signal exceeds the associated predetermined threshold value, the control unit R1 determines that the respective sensor has detected a fire.

Depending on which sensor(s) detect(s) a fire, the control unit R1 determines at which position within the air filter system F1 the fire is located, selects which fire extinguisher(s) is (are) situated at the detected position, and accordingly activates the fire extinguisher(s) at the detected position of the fire.

The control unit may in this case generate an alarm message to an external alarm system (not shown).

Furthermore, the method for the control unit R1 may comprise generating signals to (controls of) an inlet valve V1 and an outlet valve V2 to close off the air filter system F1 from the environment when a fire is detected.

Furthermore, the control unit R1 may generate a switching signal in order to (temporarily) switch off the ventilation system VT. This step may depend on the detected size of the fire.

In addition, in a further step, the control unit R1 may detect the signals from the temperature sensors TS, S1, SW within the air filter system F1 in order to determine whether the temperature within the air filter system F1 is decreasing and/or has sunk below a predetermined safe threshold value. As soon as this is the case, the control unit R1 can generate a message (for example to an external alarm system) that the fire has been extinguished. If the air filter system F1 was put out of action at an earlier stage (by closing the valves V1 and V2, and possibly also by switching off the ventilation system VT), the control unit R1 can start up the air filter system F1 again (i.e. open the valves V1, V2, and if necessary activate the ventilation system VT again). This step will cause an air flow to stream through the air filter system F1 again, as a result of which any fire by-products and remnants of fire-extinguishing agent (aerosol remnants) are transported to the blow-off duct UB and absorbed by the outlet filter F2.

Thus, possibly polluting substances are prevented from entering the living environment. Subsequent to such a (provisional) cleaning, an inspection of the filter may be carried out later in order to assess the degree of damage to the filter. For this step, it is possible to use detection by means of the discharge sensor S1 in order to detect if there are leaks in the filter material.

The method mentioned in this document may be implemented in a (computer) program which enables the processing unit of the control unit to carry out the method. Such a (computer) program may be stored on a data carrier in any machine-readable form.

FIG. 4 shows a further embodiment of a ventilation system which is provided with a fire-extinguishing system according to the present invention. Identical reference numerals to those of the preceding figures denote identical or similar elements. Sensors S1, SW and TS are present but are not illustrated for the sake of clarity.

In this embodiment, the air filter system F1 is connected to a ventilation return line system. The air filter system is used in this case to return at least part of the air passed through the air filter system F1 to a space to be ventilated VR (for example, a living space, production space or storage space) from which the air had been extracted by the air filter system F1.

A supply line L1 is connected to the inlet duct IN, which supply line L1 comprises an inlet LU for the air to be extracted from the space to be ventilated and an inlet FR for fresh air from outside the space to be ventilated VR to said space VR. Furthermore, a first connection B1 of a bypass line BP is incorporated in the supply line L1. A valve V7 is incorporated in the inlet FR for opening or closing the inlet FR in a controllable manner. Valve V7 is connected to the control unit R1 so that it can be controlled.

In this embodiment, the blow-off duct UB comprises a blow-off opening UB2, which can be closed by the valve V2. A discharge line L2 is attached to the blow-off duct UB, between the outlet filter F2 and the valve V2. This discharge line L2 comprises a return line RT2 which returns at least part of the air which has passed through the air filter system F1 to the space VR from which it was originally extracted.

The bypass line BP is connected to the outlet duct UK via a second connection B2 and to the discharge line L2 by a third connection B3. A valve V4 is positioned in the discharge line L2 between the third bypass connection B3 and the connection of the discharge line L2 to the blow-off duct UB in order to open and close the discharge line L2 in a controllable manner. Valve V4 is connected to the control unit R1 so that it can be controlled.

A valve V3 is positioned between the second bypass connection B2 on the outlet duct UK and the outlet duct K2 in order to open and close the discharge duct UK. Valve V3 is connected to the control unit R1 so that it can be controlled.

Near the first connection B1, a valve V6 is accommodated in the bypass line BP on order to open and close the bypass line BP in a controllable manner. Valve V6 is connected to control unit R1 so that it can be controlled.

Furthermore, a valve V5 is accommodated in the bypass line BP near the third connection-B3 in order to open and close the bypass-line BP in a controllable manner. Valve V5 is connected to control unit R1 so that it can be controlled.

In this embodiment, the control unit R1 is designed to move the valves V1-V7 into an open or closed position, depending on whether a fire has been detected in the air filter system F1.

The following table gives an overview of the position of the valves V1, V2, V3, V4, V5, V6, V7 during normal operation (i.e. when there is no fire in the filter) and when there is a fire in the filter.

| | Position | |
|---|---|---|
| Valve | Normal operation | Fire |
| V1 | Open | Closed |
| V2 | Open | Open |
| V3 | Open | Closed |
| V4 | Open | Closed |
| V5 | Closed | Open |
| V6 | Closed | Open |
| V7 | Open (or Closed) | Open or Closed |

In this embodiment, VT remains switched on during normal operation and during a fire.

According to the proposed wiring diagram which is controlled by the control unit R1, during normal operation air will be extracted via the inlet LU for air to be extracted. The extracted air passes through valve V1 and reaches the inlet chamber K1. From the inlet chamber K1, the air passes through the filter wall FW and reaches the outlet chamber K2. Along the outlet duct UK, the extracted and filtered air reaches the ventilation system VT via valve V3. From the ventilation system VT, the air passes through the outlet filter F2 and leaves the system via blow-off opening UB2 (via valve V2). If valve V4 is open, part of the air returns to the space to be ventilated VR via the return line RT2.

If desired, the valves V2 and V4 can be adjusted with respect to one another so that air either flows completely via UB2 (V2 open, V4 closed) or completely via return line RT2 (V2 closed, V4 open) or via both openings (V2, V4 both (completely or partly) open).

During normal operation, the bypass line BP is closed (V6 and V5 both closed).

The inlet for fresh air FR may or may not be open during normal operation in order to draw in fresh air from outside the space to be ventilated VR, if required.

In the event of a fire in the air filter system F1, the valve V1 and valve V3 will be set to the closed position by control unit R1 in order to isolate the air filter F1. As already explained above, using the signals detected by the sensors, the control unit R1 will determine in which part of the air filter system F1 the fire is burning, and on the basis thereof activate the most suitable fire-extinguishing agents.

However, it may be advantageous to allow the air in the space to be ventilated VR to flow, even during the fire in the filter F1. It may be the case that some polluted air or that some smoke nevertheless entered the space to be ventilated via the return line RT2 at the start of the fire. In order to remedy this situation, which may lead to damage of the space VR or impair the individuals or goods present in the space, the air in the space to be ventilated VR can also be extracted during a fire.

In the embodiment described here, the air in the space to be ventilated VR is advantageously also extracted during a fire in the air filter system F1 in order to prevent the abovementioned disadvantages.

In the event of a fire in the air filter system F1, air is passed via the bypass line BP from the space to be ventilated VR via valve V6 which is set to the open position by control unit R1 and via the second connection B2 of the bypass line BP to the outlet duct UK and there pumped to the blow-off opening UB2 via the ventilation system VT through valve V2 which is set to the open position by the control unit R1. Furthermore, valve V5 is set to the open position and valve V4 is set to the closed position by control unit R1, so that air from the return line RT2 is passed to the second connection B2 via the bypass line BT and there is discharged to the blow-off opening UB2 via the ventilation system VT. Depending on circumstances, the supply valve V7 for fresh air via supply FR may be open or closed during a fire.

The wiring diagram described for this embodiment may be implemented in a method and a computer program for the control unit R1.

Finally, it should be noted that the temperature sensor TS, the filter wall sensor SW and any further temperature-sensitive sensors present in order to detect an increase in temperature in the air filter system may each be a sensor which measures the temperature as such, but it is also conceivable for a sensor to be, for example, designed to perform an optical measurement in the infra-red section of the visible part of the electromagnetic spectrum, it being possible to derive a (n increase in the) temperature from the optical signal. Other types of sensors which can provide a signal relating to a temperature are also conceivable.

Other alternatives and similar embodiments of the present invention are conceivable without departing from the inventive ideas as will be clear to those skilled in the art. The inventive idea is solely limited by the attached claims.

The invention claimed is:

1. A compartmentalized filter cabinet that internally contains an inlet sub-chamber (K1) for polluted air and an outlet sub-chamber (K2) for filtered air, separated from one another by a filter wall (FW) comprising filter material that is placed in the compartmentalized air filter cabinet between the inlet and outlet sub-chambers (K1, K2), such that air can through the filter wall material from the inlet sub-chamber to the outlet sub-chamber (P16, L6); and comprising a fire extinguishing system, wherein, the fire-extinguishing system comprising a first sensor (TS) and at least one second sensor (S1), a first fire extinguisher (A1) and at least one second fire extinguisher (A2), and a control unit (R1), in which:

the first sensor (TS) and the first fire extinguisher (A1) are placed in the inlet sub-chamber (K1) and the second fire extinguisher (A2) is placed in an outlet sub-chamber (K2), the fire extinguishes being arranged for producing, as an extinguishing agent, an aerosol of solid particles type;

the second sensor (S1) is placed in an outlet (UB) of the outlet sub-chamber (K2);

the control unit (R1) is connected to the first sensor (TS) in the inlet sub-chamber (K1), and to the second sensor (S1) in the outlet (UB);

the control unit (R1) is connected to the first fire extinguisher (A1) and to the second fire extinguisher (A2) for controlling a release of the solid particles type aerosol as the extinguishing agent from the first and second fire extinguisher, respectively, and the control unit (R1) is designed for recording a first fire-detection signal from the first sensor in the inlet sub-chamber (K1), and a second fire-detection signal from the at least one second sensor in the outlet (UB);

comparing the first signal and the second signal to an associated predetermined threshold value to determine if a fire is burning;

determining at which location within the inlet and outlet sub-chambers the fire is burning as a function of the result of the comparison of the first and second signals, respectively;

selecting which of the first and at least one second fire extinguisher is located at the detected location, and activating, by means of one or more control signals, the one or more selected ones of the first and at least one second fire extinguisher in order to release the extinguishing agent.

2. A compartmentalized air filter cabinet according to claim 1, in which at least the first fire extinguisher (A1) is selected as the fire extinguisher which is situated at the detected position of the fire.

3. A compartmentalized air filter cabinet according to claim 1, in which a third sensor (SW) is positioned on or near the filter wall (FW) as a filter wall sensor; the control unit (R1) is connected to the third sensor (SW) for recording a third fire-detection signal at/on the filter wall (FW), in which the control unit (R1) is designed to compare the third signal to an associated predetermined threshold value for a burning fire, and takes the outcome of the comparison into account when determining the location where the fire is burning within the inlet and outlet sub-chambers.

4. A compartmentalized air filter cabinet according to claim 1, in which a third fire extinguisher (A3) is placed in a collecting chamber (KB) within the inlet sub-chamber (K1); the control unit (R1) is connected to the third fire extinguisher (A3) in order to control a release of fire-extinguishing agent from the third fire extinguisher and is designed to be able to select and activate the third fire extinguisher (A3).

5. A compartmentalized air filter cabinet according to claim 1, wherein the fire extinguishers (A1; A2; A3) comprise a device producing the solid particle aerosol by explosive combustion of a solid, the produced solid particle aerosol being directed to prevent direct contact of solid particle aerosol with flammable material.

6. A compartmentalized air filter cabinet according to claim 1, in which the fire extinguisher (A1; A2; A3) is provided with a deflector panel (DF) which is designed to protect the filter wall (FW) against direct contact with the aerosol flowing out of the fire extinguisher.

7. A compartmentalized air filter cabinet according to claim 1, in which the air filter system (F1) comprises a ventilation system (VT) and the control unit (R1) is connected to the ventilation system (VT) for controlling the operation of the ventilation system (VT).

8. A compartmentalized air filter cabinet according to claim 1, in which the air filter system (F1) comprises a ventilation system (VT), the control unit (R1) is connected to the ventilation system (VT) for controlling the operation of the ventilation system (VT), and in which the control unit (R1) is designed such that it can switch off the ventilation system (VT) when a fire is detected.

9. A compartmentalized air filter cabinet according to claim 1, in which an inlet valve (V1) is positioned at an inlet (IN) of the inlet sub-chamber (K1); an outlet valve (V2; V3) is positioned on an outlet side of the outlet sub-chamber (K2); the control unit (R1) is connected to the inlet valve (V1) and to the outlet valve (V2; V3) for controlling the inlet valve (V1) and the outlet valve (V2; V3), respectively, and in which the control unit (R1) is designed to bring the inlet valve (V1) and the outlet valve (V2; V3) into a position in which the air filter system (F1) is closed when a fire is detected.

10. A compartmentalized air filter cabinet according to claim 1, in which an outlet filter (F2) is incorporated on the outlet side of the ventilation system (VT) via a discharge duct [P6, L4].

11. A compartmentalized air filter cabinet according to claim 1, in which the control unit is designed for repeating, at least once, the activation by one or more control signals, following a predetermined interval, of the one or more selected ones of the first and at least one second fire-extinguisher in order to release fire-extinguishing agent.

12. A compartmentalized air filter cabinet according to claim 1, in which the control unit is designed such that it goes through a waiting period after activation, by means of the one or more control signals, of one selected one of the first and at least one second fire extinguisher for release of extinguishing agent into one sub-chamber of the inlet and outlet sub-chambers (K1; K2), and such that, once the waiting period has passed, it activates another, non-selected one of the first and at least one second fire extinguisher in order to release extinguishing agent into the other sub-chamber of the inlet and outlet sub-chambers (K1; K2).

13. A compartmentalized air filter cabinet claim 12, in which the control unit is designed for repeating, at least once, following a predetermined interval:

- the activation, by means of one or more control signals, of a selected one of the first and at least one second fire extinguisher for release of extinguishing agent,
- going through a waiting period, and
- the activation, once the waiting period has passed, of another non-selected one of the first and at least one second fire extinguisher.

14. Ventilation system for a space to be ventilated (VR), comprising a compartmentalized air filter cabinet according to claim 1.

15. Ventilation system according to claim 14, in which the ventilation system comprises a bypass line (BP) controlled by valves (V5, V6) which provides a passage for air from the space to be ventilated (VR) to the ventilation system (VT) bypassing the compartmentalized air filter cabinet, the control unit (R1) being designed to be able to extract the air from the space to be ventilated (VR) via the compartmentalized air filter cabinet during normal operation through control of the valves and to be able to extract the air from the space to be ventilated (VR) via the bypass line (BP) during a fire in the compartmentalized air filter cabinet, the compartmentalized air filter cabinet being isolated under control of the control unit (R1) by means of valves (V1, V3).

16. Method for a fire-extinguishing system in a compartmentalized air filter cabinet that internally contains an inlet sub-chamber (K1) for polluted air and an outlet sub-chamber (K2) for filtered air separated from one another by a filter wall (FW) comprising filter material that is positioned in the compartmentalized air filter cabinet between the inlet and outlet sub-chambers (K1, K2), such that in use air passes through the filter wall from the inlet sub-chamber to the outlet sub-chamber; the fire-extinguishing system comprising a first sensor (TS) and at least one second sensor (S1), a first fire extinguisher (A1) and at least one second fire extinguisher (A2), and a control unit (R1), the fire extinguishers being arranged for producing as, an extinguishing agent, an aerosol of a solid particles type, in which:

- the first sensor (TS) and the first fire extinguisher (A1) are placed in the inlet sub-chamber (K1) and the second fire extinguisher (A2) is placed in an outlet sub-chamber (K2);
- the second sensor (S1) is placed in an outlet (UB) of the outlet sub-chamber (K2);
- the method comprising the following steps:
  - recording a first fire-detection signal from the first sensor in the inlet sub-chamber (K1), and a second fire-detection signal from the at least one second sensor in the outlet (UB);
  - comparing the first signal and the second signal to an associated predetermined threshold value to determine if a fire is burning;
  - determining at which location within the inlet and outlet sub-chambers the fire is burning as a function of the result of the comparison of the first and second signals, respectively;
  - selecting which of the first and at least one second fire extinguisher is located at the detected location, and
  - activating, by means of one or more control signals, the one or more selected ones of the first and at least one second fire extinguisher in order to release the solid particles type aerosol as an extinguishing agent.

17. Control unit (R1) for a fire-extinguishing system in with a compartmentalized air filter cabinet that internally contains an inlet sub-chamber (K1) for polluted air and an outlet sub-chamber (K2) for filtered air separated from one another by a filter wall (FW) comprising filter material that is positioned in the compartmentalized air filter cabinet between the inlet and outlet sub-chambers (K1, K2), such that in use air passes through the filter wall from the inlet sub-chamber to the outlet sub-chamber;

- the control unit (R1) comprising a processing unit (21) and a memory (18, 19, 22, 23, 24), the memory being connected to the processing unit;
- the fire-extinguishing system furthermore comprising a first sensor (TS) and at least one second sensor (S1), a first fire extinguisher (A1) and at least one second fire extinguisher (A2), the fire extinguishers being arranged for producing as, an extinguishing agent, an aerosol of a solid particles type,
- in which:
  - the first sensor (TS) and the first fire extinguisher (A1) are placed in the inlet sub-chamber (K1) and the second fire extinguisher (A2) is placed in an outlet sub-chamber (K2);

the second sensor (S1) is placed in an outlet (UB) of the outlet sub-chamber (K2);

the control unit (R1) can be connected to the first sensor (TS) in the inlet sub-chamber (K1), and to the second sensor (S1) in the outlet (UB);

the control unit (R1) can be connected to the first fire extinguisher (A1) for controlling a release of the solid particles type aerosol as the extinguishing agent from the first fire extinguisher, and can be connected to the second fire extinguisher (A2) for controlling a release of an aerosol as an extinguishing agent from the second fire extinguisher, and the control unit (R1) is designed for recording a first fire-detection signal from the first sensor in the inlet sub-chamber (K1), and a second fire-detection signal from the at least one second sensor in the outlet (UB);

comparing the first signal and the second signal to an associated predetermined threshold value to determine if a fire is burning;

determining at which location within the inlet and outlet sub-chambers the fire is burning as a function of the result of the comparison of the first and second signals, respectively;

selecting which of the first and at least one second fire extinguisher is located at the detected location, and activating, by means of one or more control signals, the one or more selected ones of the first and at least one second fire extinguisher in order to release the solid particles type aerosol as the extinguishing agent.

18. A data carrier non-transiently storing in machine-readable form a computer program, for a control unit according to claim 17, in which the program, once it has been loaded into the memory of the control unit, enables the processing unit of the control unit to carry out the following operations:

recording a first fire-detection signal from the first sensor in the inlet sub-chamber (K1), and a second fire-detection signal from the at least one second sensor in the outlet (UB);

comparing the first signal and the second signal to an associated predetermined threshold value to determine if a fire is burning;

determining at which location within the inlet and outlet sub-chambers the fire is burning as a function of the result of the comparison of the first and second signals, respectively;

selecting which of the first and at least one second fire extinguisher is located at the detected location, and activating, by means of one or more control signals, the one or more selected ones of the first and at least one second fire extinguisher in order to release the extinguishing agent.

19. Method according to claim 16, further comprising the further steps of:

going through a waiting period after activation, by means of the one or more control signals, of a selected one of the first fire extinguisher and the at least one second fire extinguisher for release of extinguishing agent into one sub-chamber of the inlet and outlet sub-chambers, and once the waiting period has passed, activating another, non-selected one of the first fire extinguisher and the at least one second fire extinguisher in order to release extinguishing agent into the other sub-chamber of the inlet and outlet sub-chambers.

20. Method according to claim 16, wherein said activating step of releasing the solid particles type aerosol as an extinguishing agent comprises producing the solid particle aerosol by explosive combustion of a solid, and the produced solid particle aerosol are directed to prevent direct contact of solid particle aerosol with flammable material.

* * * * *

UNITED STATES PATENT AND TRADEMARK OFFICE

CERTIFICATE OF CORRECTION

PATENT NO. : 8,360,163 B2
APPLICATION NO. : 12/096631
DATED : January 29, 2013
INVENTOR(S) : Antonius Theodorus Cecilianus Hauzer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 381 days.

Signed and Sealed this
First Day of September, 2015

Michelle K. Lee
*Director of the United States Patent and Trademark Office*